United States Patent
Schmidt et al.

(10) Patent No.: US 7,413,595 B2
(45) Date of Patent: Aug. 19, 2008

(54) CONTROL SCHEME FOR HYBRID PSA/TSA SYSTEMS

(75) Inventors: William Paul Schmidt, Allentown, PA (US); Daniel Patrick Zwilling, Drexel Hill, PA (US); Andrew David Wright, Crewe (GB); Mohammad Ali Kalbassi, Weybridge (GB); Christopher James Raiswell, Crewe (GB)

(73) Assignee: Air Products and Chemicals, Inc., Allentwon, PA (US)

( * ) Notice: Subject to any disclaimer, the term of this patent is extended or adjusted under 35 U.S.C. 154(b) by 749 days.

(21) Appl. No.: 11/101,789

(22) Filed: Apr. 8, 2005

(65) Prior Publication Data

US 2006/0225569 A1 Oct. 12, 2006

(51) Int. Cl.
*B01D 53/047* (2006.01)
*B01D 53/26* (2006.01)
*B01J 20/34* (2006.01)

(52) U.S. Cl. .............................. 95/14; 95/106; 95/117; 95/139

(58) Field of Classification Search ............. 95/14, 95/18, 96, 99, 104, 106, 115, 117, 139, 148; 96/112

See application file for complete search history.

(56) References Cited

U.S. PATENT DOCUMENTS

| | | | |
|---|---|---|---|
| 4,472,178 A * | 9/1984 | Kumar et al. ................... | 95/99 |
| 4,541,851 A | 9/1985 | Bosquain et al. | |
| 4,552,570 A * | 11/1985 | Gravatt ............................ | 95/10 |
| 4,685,938 A * | 8/1987 | Oliker ............................. | 95/25 |
| 4,832,711 A | 5/1989 | Christel, Jr. et al. | |
| 4,941,894 A * | 7/1990 | Black ............................. | 95/14 |
| 5,296,017 A * | 3/1994 | Kono et al. ..................... | 95/14 |
| 5,407,465 A * | 4/1995 | Schaub et al. ................... | 95/14 |
| 5,443,623 A * | 8/1995 | Jonas et al. ................... | 95/101 |
| 5,855,650 A | 1/1999 | Kalbassi et al. | |
| 5,914,455 A | 6/1999 | Jain et al. | |
| 6,379,430 B1 | 4/2002 | Monereau | |
| 6,402,809 B1 | 6/2002 | Monereau et al. | |
| 6,599,347 B2 | 7/2003 | Kalbassi et al. | |
| 7,000,332 B1 * | 2/2006 | Fresch et al. ................... | 34/330 |
| 2004/0055465 A1 * | 3/2004 | Guillard et al. ................. | 95/96 |
| 2005/0150377 A1 * | 7/2005 | Friday et al. .................... | 95/96 |
| 2005/0199123 A1 * | 9/2005 | Schmidt et al. ................. | 95/96 |

FOREIGN PATENT DOCUMENTS

CA 1322727 10/1993
DE 236265 A1 6/1986

(Continued)

*Primary Examiner*—Frank M. Lawrence
(74) *Attorney, Agent, or Firm*—Willard Jones, II

(57) ABSTRACT

An improved control scheme is set forth for an adsorption process that removes water and carbon dioxide ($CO_2$) from a feed gas using a hybrid of both temperature swing (i.e. TSA) and pressure swing (PSA) to regenerate the adsorbent. The control scheme comprises adjusting the quantity of heat to be provided by the regeneration gas as a function of temperature data taken within a strategic portion of the water selective adsorbent zone. The strategic portion corresponds to the location for the desired transition from regeneration by temperature swing, to regeneration by pressure swing. In a preferred embodiment of the present invention, said quantity of regeneration heat is also adjusted as a function of the water content of the feed gas.

13 Claims, 1 Drawing Sheet

FOREIGN PATENT DOCUMENTS

| | | |
|---|---|---|
| EP | 0 766 989 | 4/1997 |
| EP | 0 815 920 | 1/1998 |
| EP | 1 226 860 | 7/2002 |
| FR | 2 617 059 | 12/1988 |
| WO | WO 2004/089536 A1 | 10/2004 |

* cited by examiner

CONTROL SCHEME FOR HYBRID PSA/TSA SYSTEMS

BACKGROUND OF THE INVENTION

The present invention is directed to an adsorption process for removing water and carbon dioxide ($CO_2$) from a feed gas that uses a hybrid of both temperature swing (i.e. TSA) and pressure swing (PSA) to regenerate the adsorbent. More specifically, the present invention is directed to a process wherein:

(a) the process employs an adsorption vessel having a feed port for introducing the feed gas and a product port for withdrawing product gas;

(b) located adjacent to feed port is a water removal zone containing a water selective adsorbent (especially activated alumina or silica gel) for adsorbing the water from the feed gas;

(c) located between the water removal zone and the product port is a $CO_2$ removal zone containing a $CO_2$ selective adsorbent (especially molecular sieve) for adsorbing the $CO_2$ from the feed gas;

(d) the process cycles between an adsorption sequence and a regeneration sequence;

(e) during the adsorption sequence:
 (i) feed gas is passed through the vessel beginning at the feed port;
 (ii) at least a portion of the water selective adsorbent becomes saturated with water;
 (iii) at least a portion of the $CO_2$ selective adsorbent becomes saturated with $CO_2$; and
 (iv) product gas is withdrawn from the product port;

(f) during the regeneration sequence:
 (i) the vessel is depressurized to a lower pressure;
 (ii) beginning at the product port, a heating regeneration gas is passed through the vessel that provides a quantity of regeneration heat to desorb (i.e. by temperature swing) substantially all of the $CO_2$ adsorbed during the adsorption sequence and a portion (but not the entire portion) of the water adsorbed during the adsorption sequence; and
 (iii) beginning at the product port, a cooling regeneration gas is passed through the vessel to desorb (i.e. by pressure swing) most or substantially all of the remaining water adsorbed during the adsorption sequence; and
 (iv) the vessel is pressurized with feed gas to prepare the vessel for its next adsorption sequence.

The above "hybrid" TSA/PSA process (hereafter the hybrid process) is taught. See in particular U.S. Pat. No. 6,599,347 by Kalbassi et al. (hereafter "Kalbassi") which teaches the hybrid process in the context of a vertical adsorption vessel where the feed port is located at the bottom of the vessel and the feed gas flows upwardly before reaching the product port located at the top of the vessel.

A key challenge in the hybrid process is to precisely calculate the quantity of heat that needs to be provided by the heating regeneration gas in (f)(ii) above so no energy is wasted heating the regeneration gas beyond what is necessary. As can be appreciated by one skilled in the art, the heat provided by the heating regeneration gas must be enough to drive the resultant heat pulse through the $CO_2$ removal zone such that it dies at a location (hereafter, the Design Location) inside the water removal zone that is far enough to have regenerated a significant portion of the water removal zone (i.e. by temperature swing), but not too far into the water removal zone such that the capacity of the cooling regeneration gas to complete the regeneration of the water removal zone (i.e. by pressure swing) is not fully utilized. In other words, the Design Location corresponds to the location within the water removal zone where the transition occurs from regeneration by temperature swing, to regeneration by pressure swing.

Kalbassi addresses this key challenge in the hybrid process by adjusting the quantity of heat to be provided by the heated regeneration gas as a function of the water content of the feed gas. As opposed to establishing a fixed quantity of heat based on the most adverse ambient conditions likely to be encountered, this provides significant energy savings. Kalbassi is an incomplete solution however vis-à-vis the present invention because, unlike the present invention, Kalbassi's adjustment of the necessary quantity of heat does not take into account temperature data during the regeneration sequence and particularly temperature data taken within a strategic portion (the Strategic Portion) of the water removal zone which is centered around the Design Location. This temperature data allows one to measure the actual location where the heat pulse dies and reconcile any discrepancies with the Design Location by appropriately adjusting the quantity of heat to be provided in the next regeneration sequence. The ability to fine-tune the adjustment of the provided heat from cycle to cycle in this fashion further increases the energy savings in Kalbassi.

In general, the Strategic Portion could be any portion of the water removal zone other than at or near the edges since, as can be appreciated by one skilled in the art, the edges of the water removal zone are not practical Design Locations for the heat pulse to die in a hybrid process due to risk of water contamination of the $CO_2$ adsorbent. (In particular, if Design Location near edge of water removal zone adjacent to $CO_2$ removal zone, this means little, if any, of the water removal zone is being regenerated by temperature swing; similarly, if Design Location near the edge of water removal zone where the feed gas is introduced, this means, little, if any, of the water removal zone vessel is being regenerated by pressure swing). To be more precise, if one were to think of the water selective adsorbent contained in the water removal zone as 10 equally thick layers (with layer 1 beginning at the end of the water removal zone adjacent to the feed port and proceeding sequentially to layer 10, layer 10 being adjacent the $CO_2$ removal zone), the Strategic Portion would comprise any 3-4 consecutive layers between (and including) layers 2 through 9. Given that the Design Location for the heat pulse to die in a typical hybrid system is typically somewhere between layers 6 and 9, it follows that the Strategic Portion will typically comprise layers 6 through 9.

U.S. Pat. No. 6,402,809 (2002) by Monereau et al. assigned to L'Air Liquide also teaches the above referenced hybrid process. Monereau further teaches controlling the temperature of the regeneration gas depending on operating conditions which include the "thermal profile of the heat front output by the [adsorber] at the end of the regeneration". Or, as more particularly taught column 5, line 5 of Monereau, the temperature of the regeneration gas is controlled according to the thermal profile as the "heat front leaves [the water removal zone]". Accordingly the temperature data is taken at the edge of water removal zone corresponding to layer 1 in the present invention's definition of the water removal zone. As discussed previously, this is contrary to teaching of present invention. In particular, such a location means, little, if any, of the ability to complete regeneration of the water removal zone vessel pressure swing is being utilized, and consequently the regeneration gas is being heated more than necessary.

U.S. Pat. NO. 4,541,851 (1985) by Bosquain et al. assigned to L'Air Liquide teaches the use of a radial adsorption bed in the above referenced hybrid process where the feed port distributes the feed gas into the exterior of the adsorption vessel, and the feed gas flows radially inward (first through the water removal zone and then through the $CO_2$ removal zone as in Kalbassi) before reaching the product port located in the interior of the vessel. To address the sensitivity of this geometry to the mechanical stress issues associated with the temperature fluctuation between the adsorption and regeneration sequences, Bosquain teaches the use of a temperature sensor disposed very close to the outer grate at the feed end of the water removal zone (i.e. again corresponding to layer 1 in the present invention's definition of the water removal zone) to prevent the heat pulse generated during regeneration from reaching this outer grate.

U.S. Pat. No. 4,832,711 (1989) by Christel et al. assigned to Pall Corporation teaches use of an adsorbent for adsorbing water from a feed gas wherein, to conserve the heat generated by the adsorption sequence for use in heating the regeneration gas, the advance of the heat pulse through the adsorbent is measured during the adsorption sequence to allow the sequence to be discontinued before the resultant heat pulse leaves the product end of the bed. There is no external heating of the regeneration gas in Christel. Accordingly, the problem addressed by the present invention (i.e. precisely determining the quantity of external heat that needs to be provided during regeneration) is a non-issue in Christel.

BRIEF SUMMARY OF THE INVENTION

The present invention is an improved control scheme for an adsorption process that removes water and carbon dioxide ($CO_2$) from a feed gas using a hybrid of both temperature swing (i.e. TSA) and pressure swing (PSA) to regenerate the adsorbent. The control scheme comprises adjusting the quantity of heat to be provided by the regeneration gas as a function of temperature data taken within a strategic portion of the water selective adsorbent zone. The strategic portion corresponds to the location for the desired transition from regeneration by temperature swing, to regeneration by pressure swing. In a preferred embodiment of the present invention, said quantity of regeneration heat is also adjusted as a function of the water content of the feed gas.

DETAILED DESCRIPTION OF THE INVENTION

Figure 1:
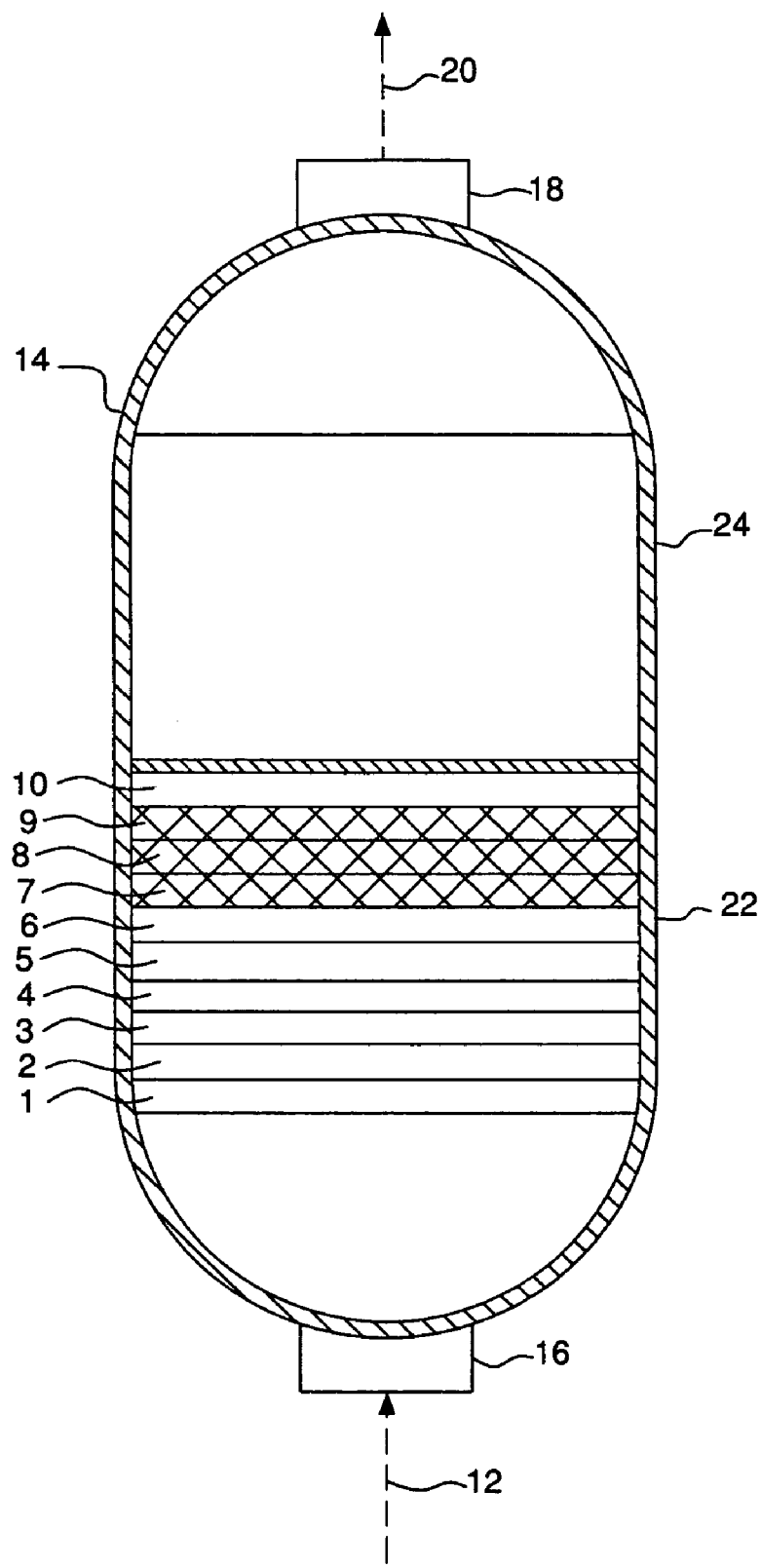
FIG. 1 is a drawing of one embodiment of the present invention.

Referring to FIG. 1, the present invention is directed to an adsorption process for removing water and $CO_2$ from a feed gas (12) wherein:

(a) the process employs an adsorption vessel (14) having a feed port (16) for introducing the feed gas and a product port (18) for withdrawing product gas (20);

(b) located adjacent to feed port is a water removal zone (22) containing a water selective adsorbent for adsorbing the water from the feed gas;

(c) located between the water removal zone and the product port is a $CO_2$ removal zone (24) containing a $CO_2$ selective adsorbent for adsorbing the $CO_2$ from the feed gas;

(d) the process cycles between an adsorption sequence and a regeneration sequence;

(e) during the adsorption sequence:
(i) feed gas is passed through the vessel beginning at the feed port;
(ii) at least a portion of the water selective adsorbent becomes saturated with water;
(iii) at least a portion of the $CO_2$ selective adsorbent becomes saturated with $CO_2$; and
(iv) product gas is withdrawn from the product port;

(f) during the regeneration sequence:
(i) the vessel is depressurized to a lower pressure;
(ii) beginning at the product port, a heating regeneration gas is passed through the vessel that provides a quantity of regeneration heat to desorb substantially all of the $CO_2$ adsorbed during the adsorption sequence and a portion of the water adsorbed during the adsorption sequence; and
(iii) beginning at the product port, a cooling regeneration gas is passed through the vessel to desorb most or substantially all of the remaining water adsorbed during the adsorption sequence;
(iv) the vessel is pressurized with feed gas to prepare the vessel for its next adsorption sequence; and (g) the water selective adsorbent contained in the water removal zone consists of ten equally thick layers, with layer 1 beginning at the end of the water removal zone adjacent to the feed gas port and proceeding sequentially to layer 10 at the end of the water removal zone which is adjacent the $CO_2$ removal zone;

The present invention is more particularly an improvement to the above process comprising adjusting the quantity of regeneration heat referenced in (f)(ii) as a function of temperature data taken within a strategic portion of the water selective adsorbent zone that, as discussed previously, corresponds to the design location for the heat pulse to die which, in general could comprise any 3-4 consecutive layers between (and including) layers 2 through 9, but more typically would comprise layers 6 through 9 as shown by the cross-shaded portion of the water removal zone in FIG. 1.

In another embodiment of the present invention, the temperature data is obtained from two locations within the strategic portion, namely from a location in layer 9, and from a location in layer 6.

In another embodiment of the present invention, the quantity of heat to be provided by the heated regeneration gas is also adjusted as a function of the water content of the feed gas (i.e. as taught in Kalbassi).

In another embodiment of the present invention, the feed gas is air.

In another embodiment of the present invention, the product gas is fed to a cryogenic air separation unit and separated into its constituent components.

In another embodiment of the present invention, the water selective adsorbent is activated alumina.

In another embodiment of the present invention, the water selective adsorbent is silica gel.

In another embodiment of the present invention, the $CO_2$ selective adsorbent is molecular sieve.

In another embodiment of the present invention, the feed gas is natural gas.

In another embodiment of the present invention, the feed gas is a synthesis gas comprising carbon monoxide and hydrogen.

The embodiment of the present invention shown in FIG. 1 employs a vertical flow vessel where (such as taught in Kalbassi) where the feed port (14) is located at the bottom of the adsorption vessel and the feed gas (10) flows upwardly through the adsorption vessel before reaching the product port (16) located at the top of the adsorption vessel. Alternatively, the present invention could employ a radial flow vessel (such as taught in Bosquain) where the feed port distributes the feed gas into the exterior of the adsorption vessel, and the feed gas flows radially through adsorption vessel (first through the water removal zone and then through the $CO_2$ removal zone as in Kalbassi) before reaching the product port located in the interior of the adsorption vessel.

The invention claimed is:

1. In an adsorption process for removing water and $CO_2$ from a feed gas wherein:
   (a) the process employs an adsorption vessel having a feed port for introducing the feed gas and a product port for withdrawing product gas;
   (b) located adjacent to feed port is a water removal zone containing a water selective adsorbent for adsorbing the water from the feed gas;
   (c) located between the water removal zone and the product port is a $CO_2$ removal zone containing a $CO_2$ selective adsorbent for adsorbing the $CO_2$ from the feed gas;
   (d) the process cycles between an adsorption sequence and a regeneration sequence;
   (e) during the adsorption sequence:
      (i) feed gas is passed through the vessel beginning at the feed port;
      (ii) at least a portion of the water selective adsorbent becomes saturated with water;
      (iii) at least a portion of the $CO_2$ selective adsorbent becomes saturated with $CO_2$; and
      (iv) product gas is withdrawn from the product port;
   (f) during the regeneration sequence:
      (i) the vessel is depressurized to a lower pressure;
      (ii) beginning at the product port, a heating regeneration gas is passed through the vessel that provides a quantity of regeneration heat to desorb substantially all of the $CO_2$ adsorbed during the adsorption sequence and a portion of the water adsorbed during the adsorption sequence; and
      (iii) beginning at the product port, a cooling regeneration gas is passed through the vessel to desorb most or substantially all of the remaining water adsorbed during the adsorption sequence;
      (iv) the vessel is pressurized with feed gas to prepare the vessel for its next adsorption sequence; and
   (g) the water selective adsorbent contained in the water removal zone consists of ten equally thick layers, with layer 1 beginning at the end of the water removal zone adjacent to the feed gas port and proceeding sequentially to layer 10 at the end of the water removal zone which is adjacent the $CO_2$ removal zone;

the improvement comprising adjusting the quantity of regeneration heat as a function of temperature data taken within a strategic portion of the water selective adsorbent zone comprising any 3-4 consecutive layers between (and including) layers 2 through 9.

2. The process of claim 1 wherein the strategic portion of the water selective adsorbent zone comprises layers 6 through 9.

3. The process of claim 2 wherein the temperature data is obtained from two locations within the strategic portion, namely from a location in layer 9, and from a location in layer 6.

4. The process of claim 1 wherein the quantity of heat to be provided by the heated regeneration gas is also adjusted as a function of the water content of the feed gas.

5. The process of claim 1 wherein the feed gas is air.

6. The process of claim 1 wherein the product gas is fed to a cryogenic air separation unit and separated into its constituent components.

7. The process of claim 1 wherein the water selective adsorbent is activated alumina.

8. The process of claim 1 wherein the water selective adsorbent is silica gel.

9. The process of claim 1 wherein the $CO_2$ selective adsorbent is molecular sieve.

10. The process of claim 1 wherein the feed gas is natural gas.

11. The process of claim 1 wherein the feed gas is a synthesis gas comprising carbon monoxide and hydrogen.

12. The process of claim 1 wherein the adsorption vessel is a vertical flow vessel where the feed port is located at the bottom of the adsorption vessel and the feed gas flows upwardly through the adsorption vessel before reaching the product port located at the top of the adsorption vessel.

13. The process of claim 1 wherein the adsorption vessel is a radial flow vessel where the feed port distributes the feed gas into the exterior of the adsorption vessel, and the feed gas flows radially through the adsorption vessel before reaching the product port located at the exterior of the adsorption vessel.

* * * * *